T. BROADBENT & J. MATES.
METHOD OF AND MEANS FOR GIVING SIGNALS.
APPLICATION FILED SEPT. 23, 1912.
1,078,823.
Patented Nov. 18, 1913.
2 SHEETS—SHEET 2.
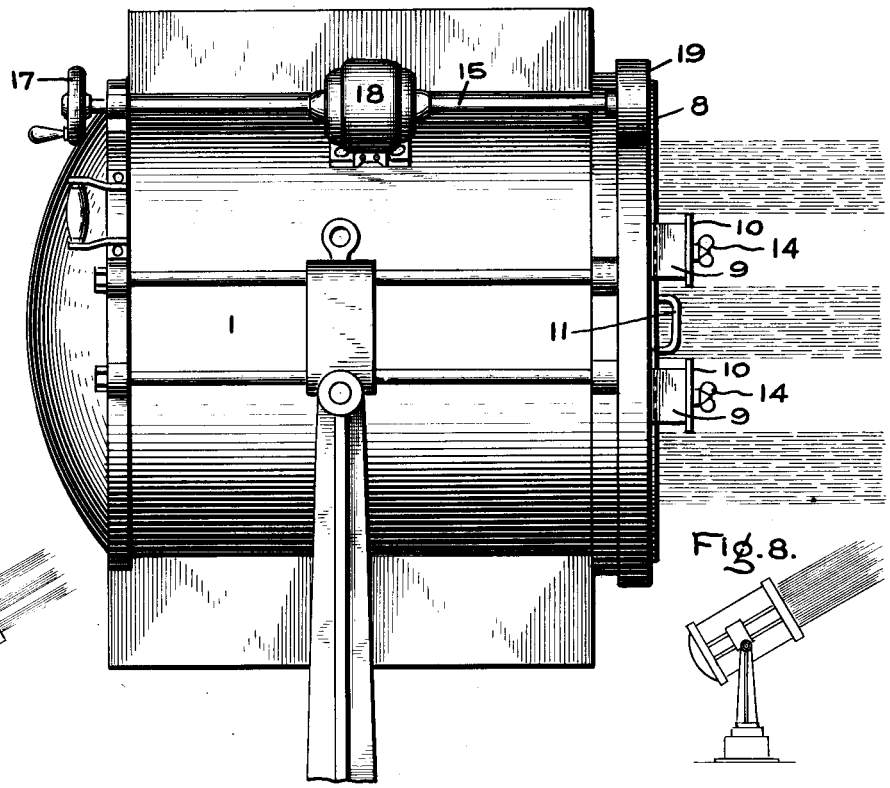
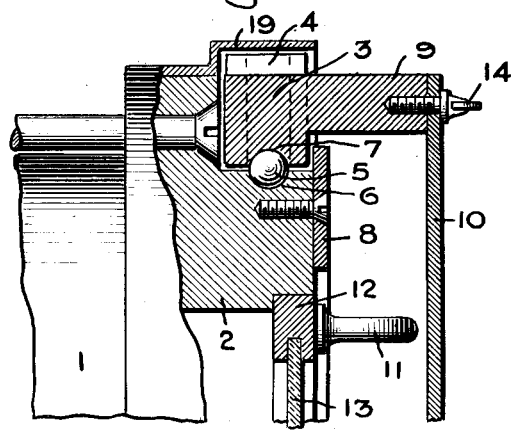
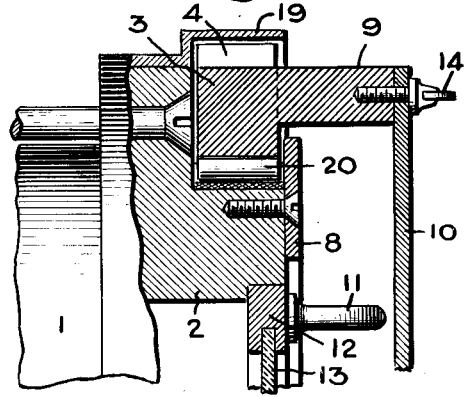
Witnesses:
Marcus L. Byng.
Helen Oxford
Inventors:
Thomas Broadbent,
James Mates,
by
Their Attorney.

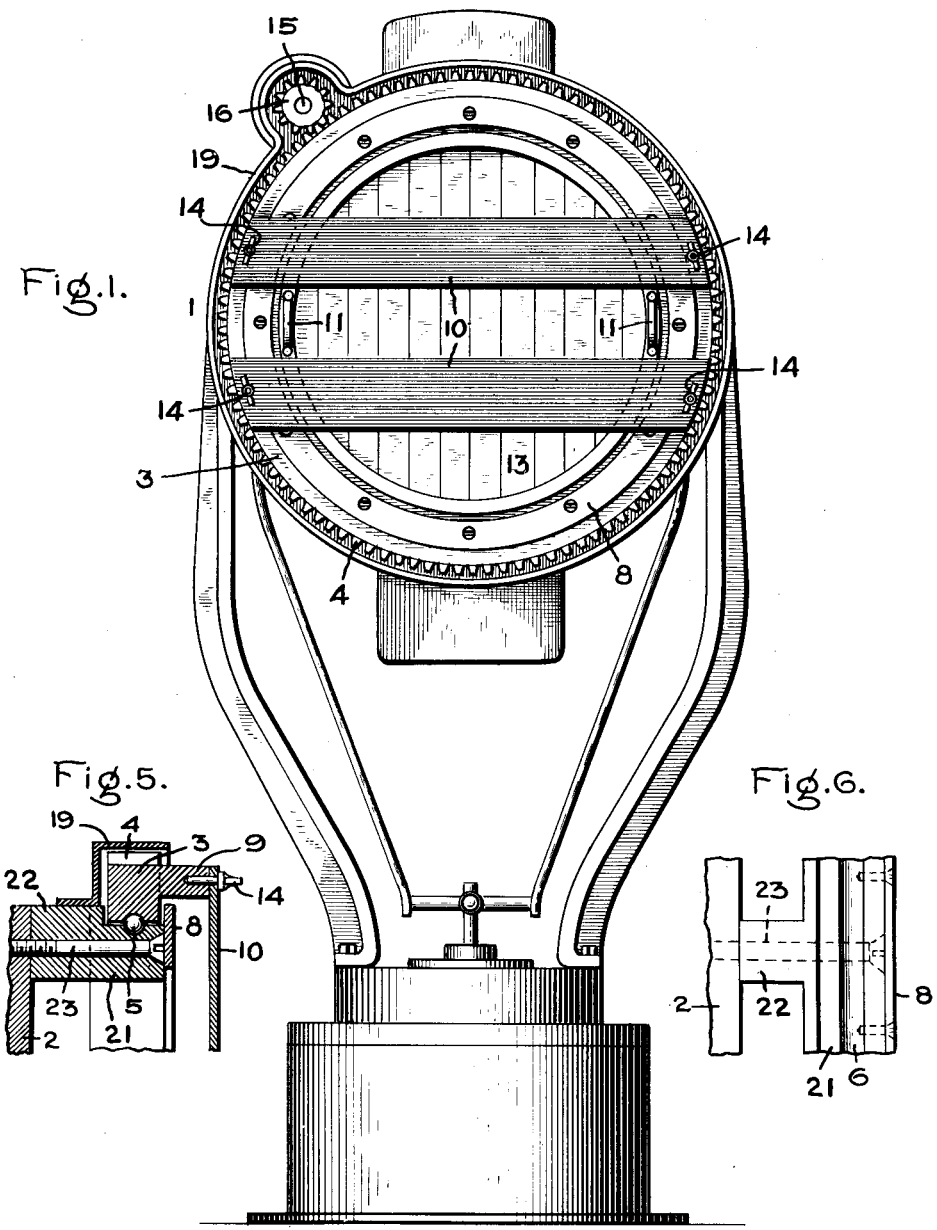

UNITED STATES PATENT OFFICE.

THOMAS BROADBENT AND JAMES MATES, OF SCHENECTADY, NEW YORK.

METHOD OF AND MEANS FOR GIVING SIGNALS.

1,078,823.  Specification of Letters Patent.  Patented Nov. 18, 1913.

Application filed September 23, 1912. Serial No. 721,944.

*To all whom it may concern:*

Be it known that we, THOMAS BROADBENT and JAMES MATES, citizens of the United States, and residents of Schenectady, in the county of Schenectady, State of New York, have invented certain new and useful Improvements in Methods of and Means for Giving Signals, of which the following is a specification.

This invention relates to signaling, and it consists in a method of and means for giving a peculiar and distinctive signal at night by means of a searchlight projector.

The signal is intended especially as a distress signal at sea, and will be described in that connection, though it is equally well adapted for use on land as an emergency signal for any desired purpose, or for advertising or display purposes.

The signal consists in so modifying a beam of light from a searchlight projector that an observer will see said beam composed, at one moment of parallel alternate portions of light and shadow, and at another moment as a single beam. This alternation in appearance recurs at regular intervals, say five or six times a minute, so that the attention of the beholder is at once arrested, and the meaning of the signal is unmistakable to a skilled observer.

The means by which we prefer to produce this signal comprises what we call "shadow bars" placed across the face of the searchlight projector, said bars being parallel and spaced apart to permit the light to pass between them. Two shadow bars are sufficient to divide the broad beam of light into five alternating narrow bands, three of light and two of darkness, producing a marked appearance which cannot fail to attract attention. In addition to the shadow bars, we provide means for causing the light beam to appear alternately banded and single. Various ways of accomplishing this result may be devised, but we prefer to revolve the shadow bars in their own plane in front of the projector so that the entire beam composed of parallel bands of light and shadow seems to rotate on its axis. When the bands present their edges to the observer, he gets the banded effect, but when all the bands are superposed, he gets the effect of a single broad beam of light. Substantially the same effect can be obtained by using a screen containing two or more holes or slots for the light to pass through. If in addition to this alternate banded and single appearance of the beam of light, the projector itself is revolved in azimuth, the sweep across the sky of this peculiar rotating shaft of light cannot fail to attract the attention of persons even at a long distance.

In the accompanying drawings, Figure 1 is a front elevation of a searchlight projector arranged to carry into effect our improved method of signaling; Fig. 2 is a side elevation of the same, the standards being broken away; Fig. 3 is a cross-section of the frame, gear and a shadow bar; Fig. 4 shows a modification; Figs. 5 and 6 show a further modification, and Figs. 7 and 8 illustrate the banded and single appearance of the rotating beam.

The searchlight projector 1 may be of any desired type or construction, provided it has a strong annular frame 2 surrounding its front end on which to support the shadow bars and their operating mechanism. In Fig. 3, this frame is shown as rabbeted to receive a ring rotatable thereon, preferably an annular gear 3 having teeth 4. The gear is preferably mounted on an antifriction ball-bearing composed of a plurality of steel balls 5 received in registering semicircular grooves 6 and 7 in the frame and gear respectively. An annular guard plate 8 is secured to the frame and overlaps the front of the gear.

Projecting from the front of the gear are posts 9 to support the shadow bars 10. The posts are tall enough to enable said bars to clear the handles 11 which are attached to the rim 12 of the usual glass front 13 of the projector. The bars 10 are made of thin sheet metal or other suitable opaque material. Their width is preferably about one-fifth the diameter of the front of the projector, and their ends are curved concentric with the gear 3. They are fastened to the posts 9 in any suitable manner by some fastening which can be quickly operated, so that they can be put in place and removed with great readiness. A convenient form of fastening is a wing nut 14 screwed upon a stud projecting from the post through an opening in the shadow bar. Sufficient play must be allowed for expansion and contraction of the bars.

When secured in place, the bars lie parallel with each other across the front of the projector, cutting off the light rays which otherwise would stream out in the zones occupied by said bars. Assuming the face of the projector to be divided into five parallel zones of equal width, those occupied by the bars are the two adjacent to the middle one, above and below.

In order to revolve the shadow bars, and thus give the effect of rotating the beam of light emerging from the projector, we provide a shaft 15 mounted in suitable bearings on the barrel of the projector and having a pinion 16 meshing with the gear 3. A hand wheel 17 enables said shaft to be rotated by hand when desired, but it is preferred to operate it by a small electric motor 18 mounted on the barrel of the projector. A housing 19 covers the gear 3 and the pinion 16.

In the modification shown in Fig. 4, the gear ring is mounted on rollers 20 instead of balls, the rollers being rabbeted into suitable transverse grooves in the frame 2.

When the searchlight projector is unusually large, so that the lamp cannot be lifted in and out through the gear ring, but must be slid in on ways in the receptacle depending below the barrel of the projector, the modification shown in Figs. 5 and 6 may be used. Here the annular gear is mounted on a strong rabbeted ring 21, which serves as an auxiliary frame and is provided with heavy lugs 22 on its rear side. Bolts 23 pass through these lugs and secure the ring to the frame 2, which does not have to be modified. The lugs hold the annular gear away from the face of the projector so that the shadow bars can readily clear the handles 11 and other projections. The entire device can be quickly applied to a searchlight, all that it is necessary to do being the insertion of the bolts 23 and the meshing of the gear teeth with the pinion on the shaft 15, which with its hand-wheel and motor are permanently secured in place. This construction may be adopted, also, in the smaller sizes of projectors, if so desired. If desired, more than one annular gear provided with shadow bars may be used to obtain various kaleidoscopic effects.

In operation, the annular gear 3 is revolved, either by hand or by the motor 18, carrying the shadow bars with it, and thus apparently rotating the zones of light and shade on the axis of the entire beam of light. If the projector is pointed upward at a considerable angle to the horizon, this rotation causes a succession of banded and solid beams, as shown in Figs. 7 and 8, which form a most distinctive night signal and one whose meaning, when once known, is instantly recognized. Moreover, there is little or no liability that the signal can be produced accidentally, because mechanism substantially the same as that hereinbefore described must be used to produce it.

We have referred to the alternate bands of light and shadow as being "parallel" but this word is to be understood in its broadest significance only, because it is almost a physical impossibility to maintain the beam from a searchlight at the same diameter throughout its entire length. The rays of light usually diverge a little so that the area illuminated is larger than the shell of the projector. The result is, that the alternate bands of the light and shadow produced by our device will broaden somewhat as they recede from the projector, but will maintain their relative width and the same distinctive appearance. The word "parallel," therefore, in the specification and claims as applied to the bands of light and shadow will be understood as meaning side by side rather than mathematically parallel.

In accordance with the provisions of the patent statutes, we have described the principle of operation of our invention, together with the apparatus which we now consider to represent the best embodiment thereof; but we desire to have it understood that the apparatus shown is only illustrative, and that the invention can be carried out by other means.

What we claim as new, and desire to secure by Letters Patent of the United States, is:—

1. The combination with a search light projector, of means for cutting off the rays of light in certain parallel transverse zones of the beam from said projector, and means for causing a rotation on its axis of the resulting banded beam.

2. The combination with a searchlight projector, of parallel shadow bars placed across its face and means for rotating on its longitudinal axis the banded beam of light thus produced.

3. The combination with a searchlight projector, of an annular gear supported by the front frame and lying in a plane perpendicular to the axis of the beam of light emitted by said projector, parallel shadow bars secured to said gear and extending across the face of said projector in a plane transverse to said beam of light, and means for revolving said gear and bars in their own plane.

4. The combination with a searchlight projector, of an annular gear supported by the front frame and lying in a plane perpendicular to the axis of the beam of light emitted by said projector, parallel shadow bars detachably secured to said gear and extending across the face of said projector in a plane transverse to said beam of light, and means for revolving said gear and bars in their own plane.

5. The combination with a searchlight projector, of an annular gear supported by the front frame of said projector, posts projecting from said gear, parallel shadow bars detachably secured to said posts, and means for revolving said gear.

6. The combination with a searchlight projector, of a ring having lugs adapted to be secured to the front frame of said projector, an annular gear mounted on said ring, parallel shadow bars carried by said gear, and means for revolving said gear.

7. The combination with means for dividing a beam of light into alternate parallel transverse zones of light and shadow, of means for rotating said beam upon its longitudinal axis.

In witness whereof, we have hereunto set our hands this 18th day of September, 1912.

THOMAS BROADBENT.
JAMES MATES.

Witnesses:
GEO. P. WHITTLESEY,
ESTHER H. MYERS.